2 Sheets--Sheet 1.

G. PALMER.
Harrows.

No. 157,024. Patented Nov. 17, 1874.

Witnesses-
Chas. F. Stansbury
N. B. Munn

Inventor-
George Palmer
by C. M. Parks.
Attorney

THE GRAPHIC CO. PHOTO-LITH. 39 & 41 PARK PLACE, N.Y.

G. PALMER.
Harrows.

No. 157,024.

2 Sheets--Sheet 2.

Patented Nov. 17, 1874.

Witnesses
Chas. F. Stansbury
H. B. Munn

Inventor
George Palmer
by C. M. Parks
Attorney

UNITED STATES PATENT OFFICE.

GEORGE PALMER, OF LITTLESTOWN, PENNSYLVANIA.

IMPROVEMENT IN HARROWS.

Specification forming part of Letters Patent No. 157,024, dated November 17, 1874; application filed January 29, 1874.

*To all whom it may concern:*

Be it known that I, GEORGE PALMER, of Littlestown, Adams county, Pennsylvania, have invented an Improvement in Harrows and Drags; and I do hereby declare the following to be a full and correct description of the same, reference being had to the accompanying drawings, in which—

Figure 1:
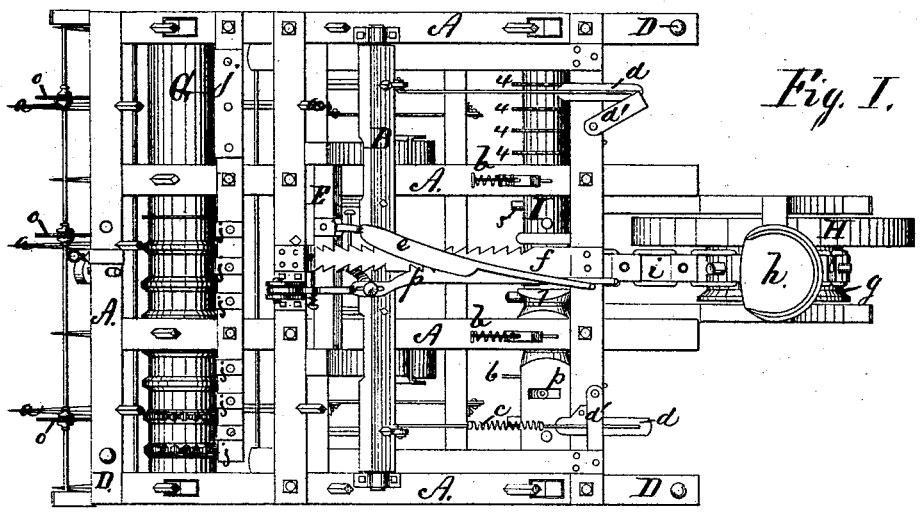
Figure 2:
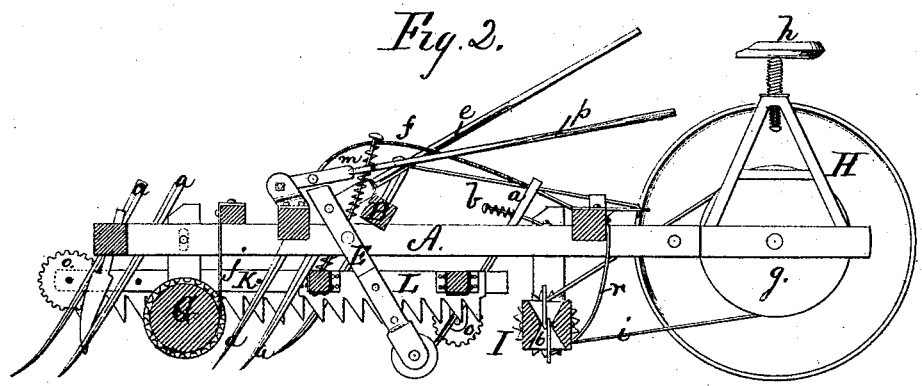
Figure 3:
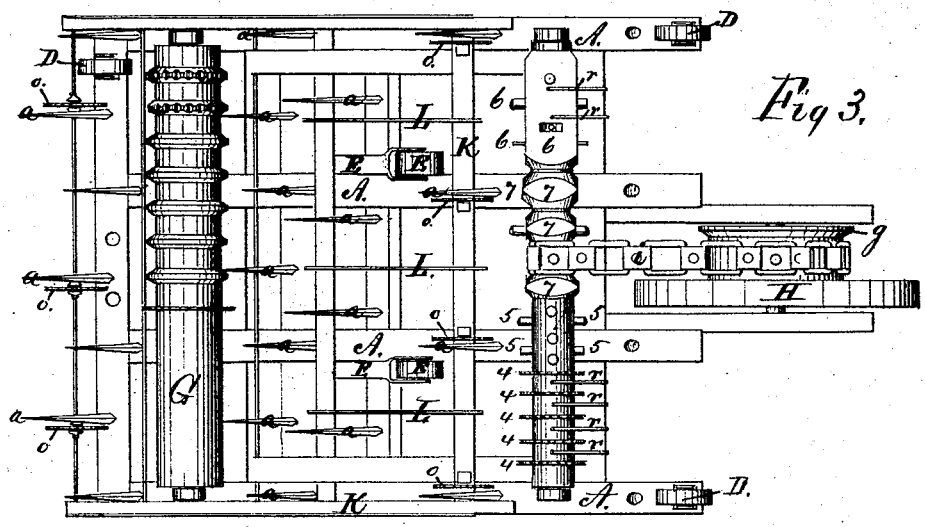
Figure 4:
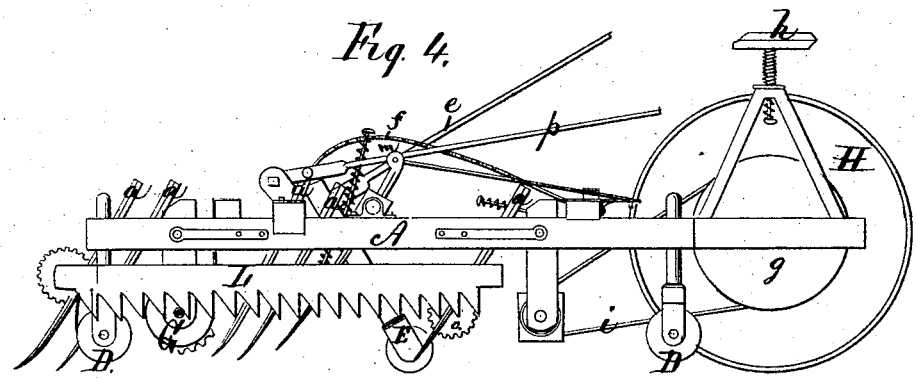

Figure 1 is a top view, and Fig. 2 is a longitudinal sectional view. Fig. 3 is a bottom view, and Fig. 4 is a side view.

The object of my invention is to construct a harrow in such a manner that the teeth can be kept free from weeds and grass, and can be regulated by a driver sitting in a seat; also, to break the clods and roll the earth. To this end my invention consists in placing a roller having ridges in the forward portion of the harrow, and a roller with saw teeth or pegs in the after part of the harrow, said roller having an independent motion communicated by a driving-wheel. My invention further consists in placing an auxiliary frame or drag beneath the harrow, the height of which can be regulated by the driver by means of a lever, said frame carrying a series of longitudinal saws, which will cut the clods. This frame also carries a series of circular disks with denticulated edges, which revolve near each tooth, and keep the teeth free from grass, weeds, &c.

In the drawings, A is the frame of the harrow, consisting of longitudinal and transverse pieces. Into this frame are secured teeth *a*, which incline forward, and are also bent forward so as to enter the ground with their points nearly forward. These teeth may be firmly secured into the frame A, or may be made to oscillate upon a pin, and made to yield to the pressure of the ground, a root, or a stone against the lower end by means of a spring, as seen at *b*, Figs. 1 and 2, or the teeth may be secured into a rock-shaft, B, which is made yielding as well as adjustable by means of a spring-rod, *c*, one end of which is secured to the rock-shaft B, and the other end formed into a hook, which may be hooked into holes in a plate, *d*, and kept from unhooking by means of the spring *d'*. In order to prevent the bent teeth, which incline forward, from running too deep into the ground, I place three rollers upon three of the corners of the harrow-frame A, the shanks of which are made adjustable in the frame, either up or down, in order to regulate the depth to which the teeth shall enter the earth. I also hang upon the frame A a swinging frame, E, provided with rollers at the lower end and operated by a lever, *e*, in reach of the driver, said lever moving the swinging frame in either direction, and securing it by means of a ratchet, *f*, with teeth upon its side running in both directions. The object of this swinging frame is to raise the harrow over stumps, stones, &c., which may come in the path of the harrow. From the forward part of the frame A of the harrow I hang in suitable adjustable bearings a roller, G, upon which are placed circular ridges. This roller rolls with the motion of the harrow, and is intended to break and crush the clods, which would not otherwise be broken. In the after part of said frame A I hang in a similar manner another roller, I, provided with circular saws 4, pins 5, or pivoted beaters 6. An independent motion is given to this roller by means of a pulley, *g*, attached to a driving-wheel, H, underneath the yielding driver's seat *h*, a chain-belt, *i*, running from said pulley to and around the roller I, giving such relative speed to the roller as may be needed by means of the relative size of the pulleys. Attached near the forward roller G are stationary scrapers *j*, constructed of spring metal, and bearing against the surface of the roller in various places, and attached near the rear roller I are rods *r*, bent to extend between the saws, pegs, or beaters, to keep the grass, weeds, &c., from clogging up the inequalities of the roller. Underneath the frame A is an auxiliary frame, K, upon which are placed, longitudinally, in the direction of the motion of the harrow, saw-blades L, with the teeth downward, for the purpose of sawing and cutting the clods of earth, and assisting the other devices in pulverizing the ground. These devices are constructed to be used in connection; but it is clear that some may be separated from the rest and used alone. The frame K can be raised or lowered, so as to bring the saws into use or not, as may be desired, by means of a lever, *p*, in reach of the driver, and hung in a fulcrum attached to the frame A, and attached to the frame I by a yielding connection, m. Said lever is secured in position by a ratchet upon the opposite side of the plate f, a spring keeping the edge of the lever into its proper tooth; also, attached to the frame K are loose denticulated disks hung in bearings, one beside each tooth in the frame A. The object of these disks is that when the frame K is let down the disks will relieve each tooth of adhering grass, &c., and tend to keep them clear. Every tooth in the harrow can be cleaned by one operation of the driver, even while the harrow is in motion. A frame containing the saw-teeth may follow the harrow proper instead of being underneath, as I have shown, and form a clod-drag; but I prefer to make it underneath, as shown, so that its depth can be regulated.

Having fully described my invention, what I have invented, and desire to secure by Letters Patent, is—

1. The combination of a harrow with a roller provided with ridges, substantially as described.

2. The combination, with a harrow, of a roller provided with saw teeth or pegs, and having an independent positive motion, substantially as set forth.

3. The combination, with a harrow, of an auxiliary adjustable frame, K, provided with longitudinal saws, substantially as described.

4. In combination with the teeth of a harrow, vertically-adjustable denticulated disks, substantially as described, for the purpose of cleaning said teeth at the will of the operator.

The above specification of my said invention signed and witnessed at Washington this 16th day of January, A. D. 1874.

GEORGE PALMER.

Witnesses:
W. P. BELL,
C. M. PARKS.